June 26, 1956 L. B. EHRLICH 2,751,620
CONNECTOR MEANS FOR WINDSHIELD WIPER BLADE
Filed June 13, 1951
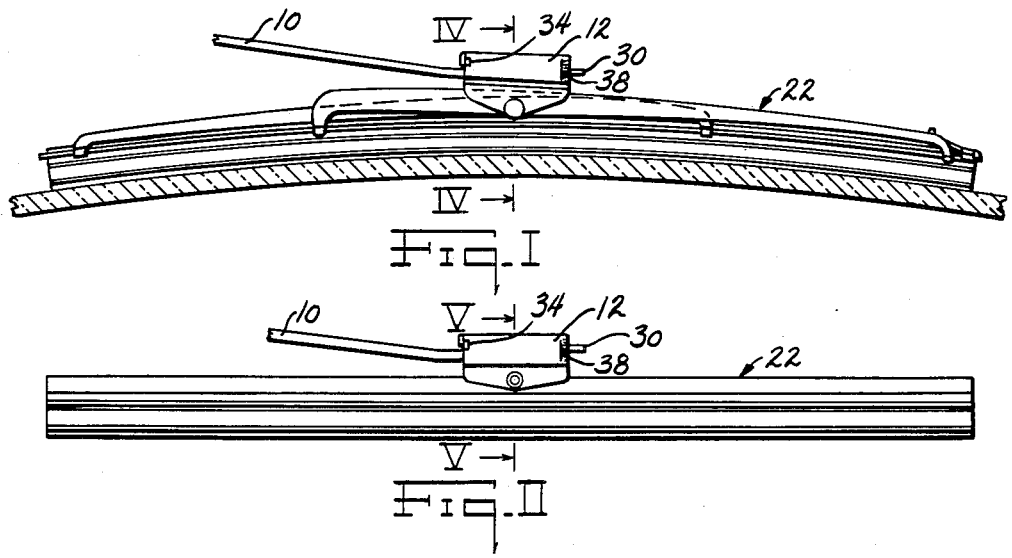
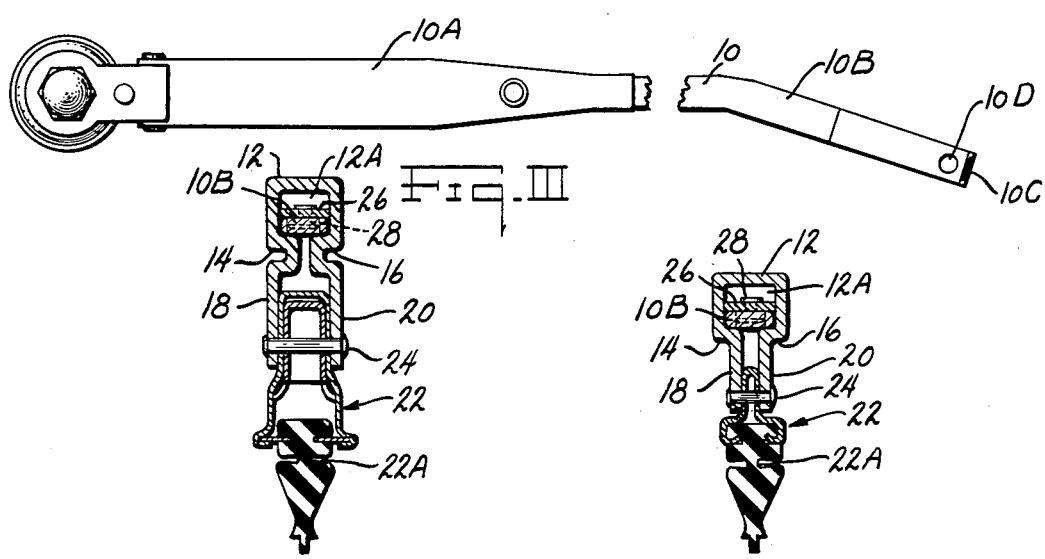
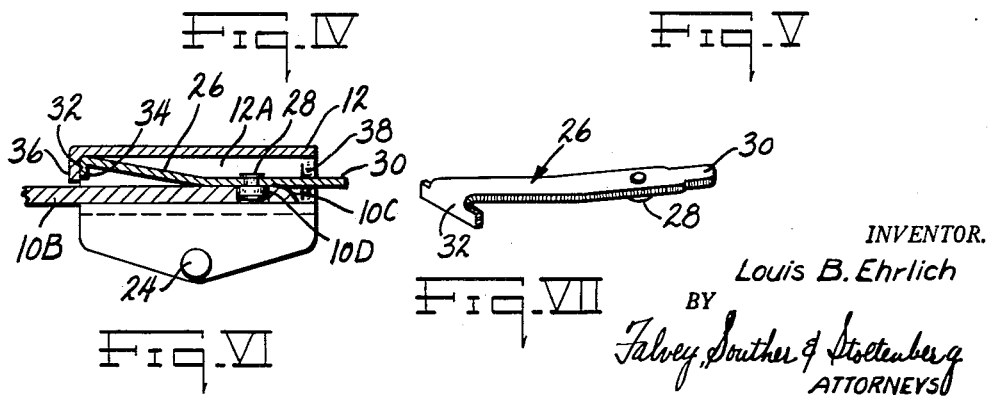
INVENTOR.
Louis B. Ehrlich
BY
Falvey, Souther & Stoltenberg
ATTORNEYS

United States Patent Office 2,751,620
Patented June 26, 1956

2,751,620
CONNECTOR MEANS FOR WINDSHIELD WIPER BLADE

Louis B. Ehrlich, Toledo, Ohio

Application June 13, 1951, Serial No. 231,291

9 Claims. (Cl. 15—250)

This invention relates to windshield wiper blades, more particularly to the attachment means between the blade and the oscillating arm which moves the blade over the surface of the windshield.

The invention contemplates the provision of a manually-releasable connection between the wiper blade and the oscillating arm, which locks the blade securely to the arm until released by manual manipulation. The invention further contemplates the provision of a blade hook-on which is simple, reliable, and cheap to manufacture.

It is, therefore, a principal object of this invention to provide a hooked connection between a wiper blade and its oscillating arm which is manually-releasable to remove the blade for replacement.

It is a further object of this invention to provide a locked hook-on for a wiper blade to cooperate with the free end of its oscillating arm, which is simple in form, reliable in operation, and cheap to manufacture in large quantities.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is an elevational view of a blade and arm for a curved windshield to which the invention has been applied;

Fig. 2 is a view, similar to Fig. 1, showing a blade and arm for a planar windshield;

Fig. 3 is a plan view of the arm;

Fig. 4 is a sectional elevational view taken along line 4—4 of Fig. 1;

Fig. 5 is a sectional elevational view taken along line 5—5 of Fig. 2;

Fig. 6 is a sectional elevational view taken along a longitudinal direction of the blade; and Fig. 7 is a perspective view of one of the parts.

Referring to the drawings, an arm 10 is shown which is formed from flat strip stock of substantially rectangular cross-section, as can be seen in Figs. 3, 4, and 5, having, at its lower end, a suitable means 10A for pivotally attaching the arm to an oscillating shaft (not shown) as is well known in the art. The terminating end 10B of the arm is bent obliquely, as shown in Fig. 3, to provide substantially parallel parking of the blade with the bottom edge of the windshield, and, adjacent its terminus, is provided with a cam surface 10C and an aperture or catch 10D, the purposes of which will be described hereinafter.

The free end 10B of the arm is of straight, flat conformation and is embraced or engaged by a channel-shaped member 12 which comprises the main body of the blade hook-on. The member 12 is given an open box construction by turning inwardly its lower sides 14 and 16, as is clearly seen in Figs. 4 and 5, the sides terminating in depending flanges, 18 and 20 spaced apart to fit over the backing channel of a wiper blade 22, to which it is attached by rivet 24. The spacing of the depending flanges 18 and 20 is controlled to suit the transverse dimension of the backing channel, and may be small, as shown in Fig. 5, which shows a blade for a planar windshield, or it may be relatively wide, as shown in Fig. 4, which shows a blade for a curved windshield. The details of the blade construction are shown in copending application, Serial No. 228,448.

Relative rotation between the blade 22 and the member 12 occurs about the permanently-attached rivet 24, whereby the angular relation between the arm 10 and the surface of the windshield is constantly adjusted as the blade 22 moves over the windshield surface. The relation between the member 12 and the terminal end 10B of the arm is relatively fixed as determined by commercial tolerances during mass production, and the blade flop is attained at a hinge portion 22A of the blade rubber element, all as set forth in the aforementioned application. The relative rotation of the member 12 about the pivot is limited to a relatively small angle and may be controlled by conforming the flanges 18 and 20 with symmetrical oblique cutaway portions about the rivet 24 which is positioned at the apex as shown in Fig. 2. These oblique cutaway portions may cooperate with the flat upper portions of the blade 22 (Fig. 5) to form a stop to limit such relative rotation.

The open box-like construction of the member 12 forms a longitudinal pocket 12A which extends for the length of the member 12, and is adapted to cooperate with the free end 10B of the arm 10 as is best seen in Figs. 4, 5, and 6. The dimensions of the pocket may vary to suit various widths of the arm 10B, but preferably the pocket is made of substantially square cross-section, as shown with the lower side of the arm element 10B fitted against the upper side of the members 14 and 16, which carry the force applied by the arm in urging the wiper element against the surface of the windshield. This leaves a substantial space above the arm element 10B, which is occupied by a manually-operable latch means which will now be described.

The manually-operable latch means consists of a spring element 26, shown in perspective in Fig. 7, and is generally of a T-shape, having a depending projection such as a rivet 28 attached thereto adjacent the end having an attenuated portion 30, which extends beyond the end of the member 12 as best seen in Figs. 1, 2, and 6 for convenient manual manipulation. The element 26 has its crossbar 32 bent downwardly at such an angle that when the element is fitted into the sides of the box construction 12 in slots 34 provided in its sides, the spring element is slightly deformed and given a spring bias to urge the rivet 28 toward the bottom sides 14 and 16. The upper web of the member 12 is provided with a projection 36 adjacent the slots 34 which house the ends of the crossbar 32, so that when it is bent downwardly, the crossbar 32 is firmly held in position in the slots to form an anchor for the spring member 26 (Fig. 6). The projection 36 also limits the movement of the arm member 10B when such is inserted in the pocket 12A by cooperating with its upper side by its terminating end after it has been bent downwardly.

When the free end 10B of the arm is inserted in the pocket by relative movement therebetween, the leading edge 10C, which is chamfered, contacts the lower side of the spring element 26 and urges it upwardly against the spring bias until it hits the rivet 28, at which the chamfer acts as a cam and quickly thrusts the whole spring end upwardly, so that the rivet rides on the upper surface of the arm member. This continues as the arm end advances until the rivet drops into the hole 10D, and interlocks therewith, which occurs by the action of the spring bias. The arm and the member 12 are thereby locked together, including the blade 22, and will remain so locked together until released by manual manipulation of the spring member 26. The dimension of the element 12 is sufficient to give the rivet head room in the pocket 12A to move upwardly to attain this result.

When it is desired to remove the blade from the arm 10, the operator thrusts the portion 30, which extends beyond the member 12, upwardly with his finger to free the rivet 28 from the aperture or catch 10D of the arm and withdraws the arm element 10B from the pocket. The insertion of the arm element, as already described, is automatic and is accomplished without manual manipulation of the member 30 being brought about by the camming action of the leading edge 10C of the arm.

To prevent improper insertion of the arm element into the pocket 12A from the end at which the manually-manipulatable element 30 is located, a pair of dimples 38 project inwardly within the locus of such attenuated portion 30, being of a dimension to prohibit the entrance of the end of the arm and yet not interfere with the movement of the portion 30 between them.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a device of the class described, an oscillatable arm having a straight, flat terminating end provided with a catch, a wiper blade adapted to be attached to said arm, a member pivoted to said blade having means including a channel with inwardly extending side portions defining a pocket adapted to house the end of the arm by relative longitudinal movement, spring means co-operating with the member, and means cooperating between the spring means and the catch for interengagement to prevent withdrawal of the arm end from the pocket, said last means being adapted for manual manipulation to disengage said parts to allow withdrawal of the arm end.

2. In a device of the class described, an oscillating arm having a terminating end of substantially straight, flat conformation provided with a catch means, a wiper blade adapted to be attached to said arm, a member pivotally attached to said blade having means including a channel with inwardly projecting side portions defining an elongated pocket adapted to snugly engage the end of the arm by relative longitudinal movement, spring means extending longitudinally of said pocket having a manually manipulatable projection extending beyond the member, and means cooperating between the spring means and the catch means for interengagement for locking the arm end in the pocket, said means being adapted for manual manipulation to disengage it from the catch to allow withdrawal of the arm end.

3. In a device of the class described, an oscillating arm including a member of strip stock having a terminating end provided with an aperture, a wiper blade adapted to be attached to said arm, a channel-shaped member pivotally attached to said blade including inwardly extending side portions defining a pocket adapted to closely embrace the terminating end of the strip of the arm and to engage said end by relative longitudinal movement, interengaging means in the pocket cooperating with the aperture in the terminating end of the arm, spring means to bias the interengaging means to locking position to prevent all relative movement between the arm and the channel-shaped member, and manual means cooperating with said interengaging means whereby said means is moved against the bias of the spring to disengage the means from the aperture in the arm member to allow withdrawal of the arm end from the pocket.

4. In a device of the class described, an arm including a member of strip stock of rectangular conformation having a terminating end provided with a catch, a wiper blade adapted to be attached to said arm, a channel-shaped member pivotally attached at its open side to said blade at a central location, inwardly extending side portions of the member defining a pocket adapted to interengage with the terminating end of the strip of the arm by relative longitudinal movement, interlocking means in the pocket cooperating with the catch in the terminating end of the arm when the terminating end of the arm is in operative position in the pocket, spring means to bias the interengaging means to locking position to prevent all relative movement of the arm end in the pocket, and manual means cooperating with said interengaging means whereby said means is moved against the bias of the spring to disengage the means from the catch to allow withdrawal of the arm end from the pocket.

5. In a device of the class described, an arm including a member of strip stock having a terminating end provided with an aperture, a wiper blade adapted to be attached to said arm, a channel-shaped member pivotally attached to said blade including inwardly projecting side portions defining a pocket adapted to interengage with the terminating end of the strip of the arm by relative longitudinal movement, stop means to limit the interengagement of the parts, interengaging means interlocking with the aperture in the terminating end of the arm when the arm end is inserted in the pocket to prevent substantially all relative movement of the arm end in the pocket, spring means to bias the interengaging means to locking position, and manual means extending beyond the channel-shaped member cooperating with said interengaging means whereby said means is moved against the bias of the spring to disengage the means from the aperture to allow withdrawal of the arm end from the pocket.

6. In a device of the class described, a wiper blade element having means for point application of force toward the windshield, a channel-shaped clip member attached on its open side to the blade by said means to provide a pivotal connection therebetween, indentations in the channel member extending inwardly to provide a pocket positioned longitudinally of the blade in the bight of the channel, an arm member having a straight, flat terminal extension adapted to be snugly fitted into the pocket, and manually operable latch means on one of the cooperating members to cooperate with a catch on the other member to lock said members together in operable relation to prevent relative movement therebetween.

7. In a device of the class described, a wiper blade element having means for point application of force toward the windshield, a channel-shaped clip member permanently attached on its open side to the blade by said means to provide a pivotal connection therebetween, indentations in the channel member extending inwardly to provide a pocket positioned longitudinally of the blade in the bight of the channel, an oscillatable arm member having a straight, flat terminal extension adapted to be snugly fitted into the pocket, and manually operable latch means in the pocket to cooperate with a catch on the arm member to lock the members together in operable relation without substantial relative movement.

8. In a device of the class described, a wiper blade element having means for point application of force toward the windshield, a channel-shaped clip member permanently attached on its open side to the blade by said means to provide a pivotal connection therebetween, indentations in the sides of the channel member extending inwardly to provide a pocket positioned longitudinally of the blade in the bight of the channel, an oscillatable arm member having a straight, flat terminal extension adapted to be snugly fitted into the pocket of the channel member, manually operable latch means in the pocket attached to the channel member, and a catch on the arm member to cooperate with the latch means to lock the members together to allow substantially no relative movement therebetween.

9. In a device of the class described, a wiper blade element having means for point application of force toward the windshield, a channel-shaped clip member permanently attached on its open side to the blade by said means to provide a pivotal connection therebetween, indentations in the sides of the channel member extending inwardly to provide a pocket positioned longitudinally of the blade in the bight of the channel, an oscillatable arm member having a straight, flat terminal extension adapted to be snugly fitted into the pocket, a cam member on the leading edge of the extension, and manually releasable latch means in the pocket attached to the channel to cooperate with a catch on the arm member to lock the members in operable relation without substantial relative movement, said latch means being automatically operable by the cam member on the arm extension when the members are being engaged.

References Cited in the file of this patent

UNITED STATES PATENTS

| | | |
|---|---|---|
| 1,658,312 | Trimble | Feb. 7, 1928 |
| 1,920,730 | Wiseman | Aug. 1, 1933 |
| 2,443,113 | Nesson | June 8, 1948 |